3,192,285
ISOMERIZATION PROCESS
Janice K. Martin, Huntington Beach, Calif., assignor to Shell Oil Company, New York, N.Y., a corporation of Delaware
Filed July 17, 1963, Ser. No. 296,160
6 Claims. (Cl. 260—683.73)

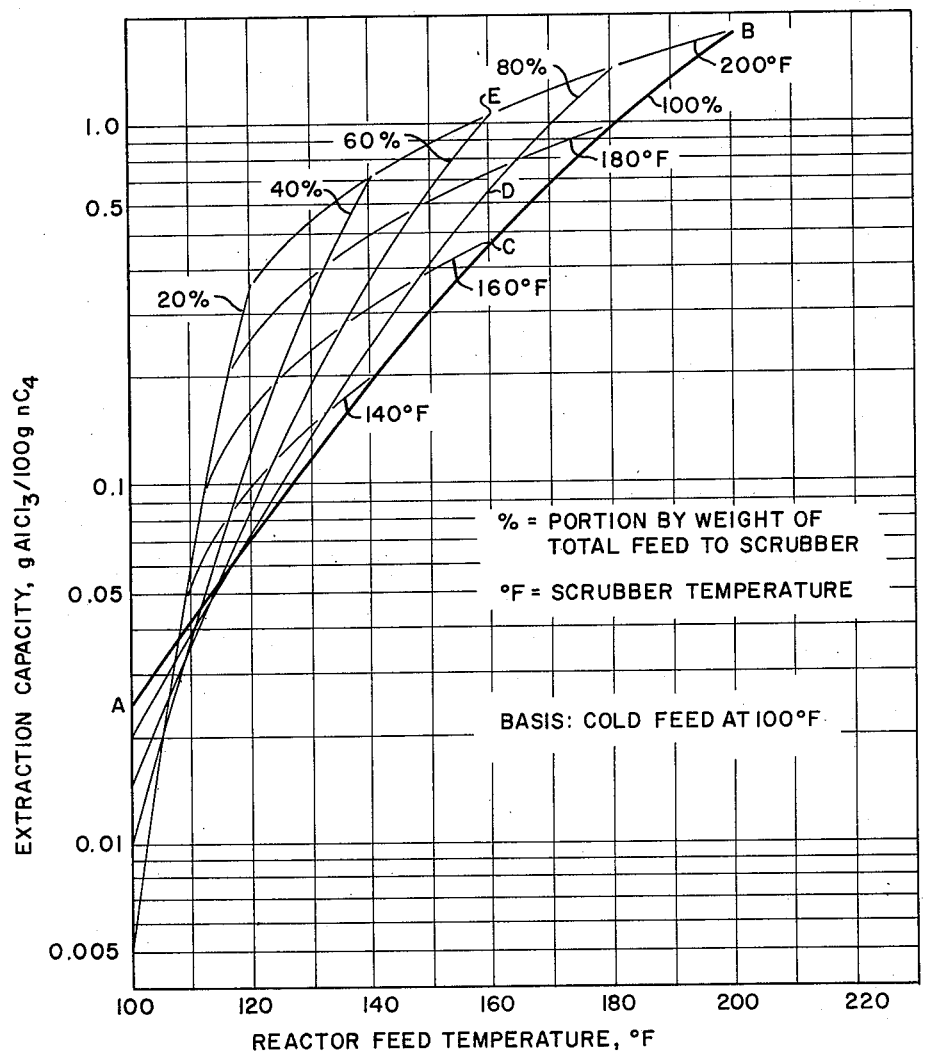

This application is a continuation-in-part of application Serial No. 151,051, filed November 8, 1961, now abandoned.

This invention relates to an improved process for effecting catalytic conversions in the liquid phase with fluid catalyst. More particularly, this invention relates to the isomerization of saturated hydrocarbons in the liquid phase with catalyst of the molten salt type especially such as molten salt mixtures comprising metal salts of the Friedel-Crafts type.

The liquid phase isomerization of normal paraffins such as normal paraffins having from 4–6 and higher carbon atoms per molecule, is well known and has been in commercial use for many years. The isomerization process is described for example in the "Oil and Gas Journal," No. 14, page 151, April 3, 1961. In brief, the isomerization process comprises passing a normal paraffin with dissolved HCl at a slightly elevated temperature into a reactor where it is contacted with a molten salt mixture comprising aluminum chloride and antimony chloride. After phase separation from the catalyst usually within a section of the reactor itself, the isomerizate flows to a catalyst removal column for separation of dissolved catalysts by simple fractionation. The recovered catalyst is pumped from the catalyst removal column back to the reactor while the isomerizate is taken overhead, condensed, and then pumped to an HCl stripper column where the acid gas is removed and recycled to the reactor. The isomerizate, thus substantially freed of HCl and catalyst components, is generally given a caustic wash before ultimate use.

In the isomerization of normal paraffins with Friedel-Crafts type catalysts there is formed a catalyst sludge which is insoluble in hydrocarbon and which is retained in the molten catalyst mixture. The sludge is predominantly organo-aluminum halide complexes formed as a result of undesirable side reactions, such as the reaction of aluminum chloride with intermediate reaction products or/and impurities such as olefinic and cyclic hydrocarbons in the feed. In addition, minor amounts of inorganic compounds are formed from the reaction of metal halide with traces of water present in the feed.

The presence of even relatively small proportions of sludge considerably reduces the activity of the catalyst and thus requires higher aluminum chloride concentrations for the same isomerization activity. As a consequence, corrosion rates are higher. Therefore, sludge removal from the catalyst, preferably continuously, is necessary in order to assure efficient operation of the isomerization process.

Heretofore, this recovery problem had been solved by contacting at least part of the sludge-containing catalyst countercurrently with the heated normal paraffin feed in an extraction zone generally referred to as a catalyst scrubbing zone. Active catalyst components comprising for example aluminum chloride and antimony trichloride are dissolved in the feed stream and thus are returned to the reaction zone dissolved in the hydrocarbon. The sludge, which is insoluble in the hydrocarbon, settles to the bottom of the scrubbing zone and is withdrawn, usually periodically, from the system.

In the above method the catalyst scrubbing capacity is limited to the amount of active components which can be recovered in the feed, which in turn, is determined by the temperature and the amount of feed. Solubility of the metal halide components of the catalysts in the hydrocarbon feed is dependent on the temperature, solubility being reduced as temperature is lowered. At low temperatures, therefore, solubility of metal halides in the hydocarbon is quite low and therefore the sludge-containing catalyst must be contacted with a larger amount of hydrocarbon to recover a given amount of metal halide. Since there is only a given amount of feed, scrubbing rate is effectively limited by feed temperature. Maximum feed temperature, however, is limited by the desired temperature at which the hydrocarbon is introduced into the reaction zone, which is preferably held quite low since the thermodynamic equilibrium for the isomerization of normal paraffins to the desired branched chain isomer becomes less favorable with an increase in the processing temperature. Since the isomerization reaction is exothermic, the feed temperature is normally maintained below the reaction temperature to absorb at least a part of the heat released. To achieve maximum scrubbing capacity, therefore, it has been the practice to scrub a portion of the catalyst withdrawn from the reaction zone with the total amount of the normal paraffin feed which has been heated about to the temperature at which it is desired to introduce the feed into the reaction zone.

Experience has shown that there is a minimum practical operating temperature for the scrubber below which the catalyst may freeze and plug the equipment. This necessitates a minimum operating scrubber temperature which is often above the desired reactor feed inlet temperature.

It is an object of the present invention to provide an improved process for the isomerization of normal paraffin, and particularly, for the isomerization of normal paraffins with a molten salt catalyst of the Friedel-Crafts type. Another object of the invention is to provide an improved process for the isomerization of normal paraffins with a molten salt comprising aluminum chloride and antimony chloride wherein the capacity for recovering catalyst components from catalyst sludge is increased. Further objects and advantages of the invention will become apparent to those skilled in the art from the following detailed description.

It has now been found that catalyst scrubbing capacity in the liquid phase isomerization of normal paraffins with a molten salt catalyst of the Friedel-Crafts type can be increased by separating the normal paraffin feed into a first portion and a second portion, heating the first portion to a temperature which is in excess of the desired reaction zone inlet temperature and such that when the heated first portion and the second portion are mixed, the mixture is at the desired reaction zone inlet temperature, scrubbing at least part of the sludge containing catalyst with the heated first portion in a scrubbing zone, separating from insoluble catalyst sludge the first portion now enriched in dissolved catalyst components, then mixing the first portion and the second portion and passing the mixture at the desired reactor inlet temperature to an isomerization zone for conversion of the normal paraffin to isoparaffin in the presence of the molten salt Friedel-Crafts type catalyst. In some cases it may be desired to introduce the two separate portions of feed to the isomerization zone through separate entries without prior mixing. Feed to the isomerization process can be one or more normal paraffins or a mixture of one or more normal paraffins with other hydrocarbons. While it is preferred to isomerize normal paraffins having from four through six carbon atoms per molecule, higher carbon number paraffins can be isomerized if desired. The preferred normal paraffins can be obtained from any suitable source and are generally available as a straight-run fraction obtained from the distillation of crude petroleum oil.

The isomerization feed, usually available in the refinery at a temperature in the range from about 80° to 120° F., must be heated to the temperature approaching that at which it is desired to carry out the isomerization reaction. The reaction is carried out at a temperature which can range from the minimum temperature at which the catalyst can be maintained in the molten stage up to about 250° F. or even higher. As mentioned hereinbefore, the thermodynamic equilibrium for the isomerization reaction is much more favorable for the desired isoparaffin product at lower temperatures. Therefore, it is desired generally to operate the isomerization reaction zone at a temperature which is only slightly above the freezing point of the catalyst. The freezing point of the multi-component catalyst is dependent on the particular salts used and the catalyst composition. In addition, the presence of other components such as dissolved hydrocarbons and even of catalyst sludge also affects the freezing point of the catalyst. If desired, a suitable freezing point depressant can be added to the catalyst melt to permit operation at low temperatures. Generally, however, it is desired to carry out the isomerization at a temperature in the range of about 120° F. to about 250° F.

The isomerization catalyst is a molten salt of the Friedel-Crafts type. A preferred catalyst is a molten salt mixture of antimony halide and aluminum halide. A particularly preferred catalyst is a molten mixture of about 84 to 98% by weight antimony trichloride and 16 to 2% by weight aluminum chloride.

The isomerization is generally effected in the presence of a hydrogen halide, e.g., hydrogen chloride, which serves as a catalyst promoter. The amount of hydrogen halide is about 1% to 25%, preferably 5% to 15% molar, basis feed.

The formation of catalyst sludge in the isomerization conversion is affected by many factors. For example, as mentioned hereinbefore, impurities in the feed such as water or aromatic hydrocarbons, e.g., benzene, react with the metal halide catalyst to form sludge. Sludge make is also greatly affected by side reactions such as cracking which are influenced by catalyst concentration, reaction temperature, nature of the feed, and the like. In this respect, the higher carbon number paraffins such as pentane and hexane crack more easily than butane, therefore, it is generally desired to carry out the isomerization reaction in the presence of hydrogen, generally not more than about 3% molar, basis feed, to suppress cracking and other side reactions.

The advantage which can be obtained by the process of the invention can be seen from the drawing wherein the sole figure shows the extraction capacity on a logarithmic scale for a given weighted average isomerization zone inlet temperature, on the basis of original feed available at 100° F. Extraction capacity is expressed as grams of aluminum chloride per 100 grams of total hydrocarbon feed to the reaction zone which in this instance is normal butane. The extraction of aluminum chloride is shown since this material is less soluble and more difficult to extract with hydrocarbon feed compared to antimony trichloride.

Referring to the drawing, line AB indicates the amount of aluminum chloride which can be extracted when the total amount (100%) of the normal butane feed is passed through the scrubber at any given reactor feed temperature. Line AB also represents the solubility of aluminum chloride in normal butane. The series of lines marked with a percentage figure represent the scrubbing capacity, basis total reactor feed, which is obtained by passing through the scrubber at a particular temperature that portion of the total feed designated by the percentage figure. Thus, for the 60% line, only 60% by weight of the total feed is passed through the scrubber. The series of lines marked with a temperature figure represent the scrubbing temperature.

For a specific illustration, it is desired to isomerize a normal butane fraction with a molten salt catalyst comprising aluminum chloride and antimony trichloride. The normal butane fraction is available at a temperature of 100° F. and is to be charged at a temperature of 160° F. to the isomerization reactor. In carrying out catalyst scrubbing in the conventional manner, the normal butane feed fraction is heated to 160° F. and introduced into the scrubber wherein the hydrocarbon contacts a stream of catalyst withdrawn from the isomerization zone, thereby extracting active catalyst components from the insoluble sludge. Under these conditions, scrubbing capacity is about 0.48 grams of aluminum chloride per 100 grams of hydrocarbon feed, indicated in the drawing as point C on the 100% line.

Now, in accordance with the process of the invention, only a portion of the hydrocarbon feed is heated and passed through the scrubber. For the case where it is desired to pass 80% by weight of the hydrocarbon feed through the scrubber, scrubber capacity is indicated at point D which is the point at which the 80% line crosses the desired reactor inlet temperature of 160° F. The scrubbing capacity of 0.67 gram of aluminum chloride per 100 grams of total hydrocarbon feed is an increase of nearly 40% over that where all of the feed is used for scrubbing at reaction inlet temperature.

Similarly, when it is desired to pass only 60% of the feed through the scrubber, scrubber capacity is indicated at point E which is the point at which the 60% line crosses the desired reactor inlet temperature of 160° F. In this case, scrubbing capacity is 1.1 grams of aluminum chloride per 100 grams of reactor hydrocarbon feed.

The temperature to which the hydrocarbon passing to the scrubber must be heated to give the desired weighted average reactor inlet temperature as indicated by the particular scrubber temperature curve which crosses the respective percent line at the desired reactor inlet temperature. Thus, with 80% of the hydrocarbon passing through the scrubber, the hydrocarbon must be heated to 175° F. (by interpolation between the 160° F. and 180° F. temperature lines). With 60% of the feed being passed to the scrubber, a temperature of 200° F. is required. The temperatures to which the portion of the feed passing to the scrubber must be heated is based on a heat balance on the basis that for all practical purposes heat losses to the atmosphere are negligible, any sensible heat required to raise the catalyst stream to scrubber temperature is negligible, and heat capacity of the hydrocarbon is substantially constant over the temperature range involved.

Although the illustration has been made for an original feed at about 100° F., similar results can be obtained with the original feed at other temperatures. For example, with feed available at 120° F. and a reactor inlet temperature of say 160° F. is desired, a scrubber temperature of about 170° F. would be used when 80% of the feed is passed through the scrubber. Under these conditions, the scrubber capacity would be 0.57 gram of aluminum chloride per 100 grams of hydrocarbon feed. Thus, there is still an appreciable gain in scrubbing capacity over that which could be obtained by passing all of the feed through the scrubber at reaction inlet temperature.

It is to be noted that when a small amount of feed, such as 20% of the feed, is passed through the scrubber, relatively high scrubber temperatures are required. This is necessary since the heat supplied to the portion of the feed passed to the scrubber must be sufficient to raise the remainder of the feed to the desired weighted average reactor inlet temperature. Thus, although overall scrubbing capacity is greatly improved at the high temperatures, it is generally desired to limit the scrubber temperature to more practical levels. Consequently, it is preferred that from about 40% to about 95% by weight of the available feed is passed to the scrubber and more preferably from about 50% to about 90% of the feed is to be passed to the scrubber.

It is to be noted that the advantages of the process of the invention are reduced materially as the reactor inlet temperature becomes lower and approaches the original feed temperature. This is attributed to the relatively small temperature becomes lower and approaches the original reactor inlet temperature and to the low solubility of aluminum chloride in the hydrocarbon at the relatively low temperatures. Thus, to obtain a material benefit from the process of the invention, the reactor inlet temperature should be at least 120° F. and preferably at least 140° F. At such reaction inlet temperatures, it is preferred that the temperature of the original feed be at least 15° F. and preferably at least 20° F. below the reactor inlet temperature.

The process of the invention can be advantageous also where it has been necessary to operate existing units with all the feed passing through the scrubber at such high temperatures that excessive vaporization is obtained in the reactor. Some vaporization of hydrocarbon in the reactor is often desired since it removes heat from the reactor as latent heat of vaporization and thereby serves to maintain the reaction temperature at a sufficiently low level. Excessive vaporization within the reactor is, however, undesirable because it can result in the preferential loss of the HCl promoter to the vapor phase which tends to reduce catalyst activity. Moreover, the excessive vaporization can also lead to increased velocities, turbulence, and higher corrosion rates in the isomerization equipment. Therefore, by operating in accordance with the process of the invention, it is possible to reduce reactor inlet temperature and yet achieve the same scrubbing capacity as could be obtained by passing all of the feed to the scrubber. For example, in an operation with approximately 75% of the total feed being passed through a scrubber at 175°, reactor inlet temperature has been reduced approximately 10–12° F. with a resulting increase in conversion of isobutane of approximately 1% by volume compared to operation with all of the feed being passed through the scrubber at the higher temperature.

Moreover, by injecting the HCl promotor into the cold bypassed feed, better mixing and improved solution of HCl in the hydrocarbon is generally obtained.

I claim as my invention:

1. In the isomerization of a normal paraffin hydrocarbon to an isoparaffin wherein said hydrocarbon is contacted in a reaction zone at an elevated temperature with a molten salt catalyst comprising aluminium chloride, thereby deactivating a portion of the catalyst to a catalyst sludge, the improvement which comprises separating the hydrocarbon feed, which is at a temperature at least 15° F. below the reaction zone inlet temperature, into a first portion and a second portion, heating the first portion to a temperature which is at least above the reaction zone inlet temperature and such that the weighted average temperature of the two portions is the reaction zone inlet temperature, scrubbing at least a portion of the sludge-containing catalyst with the heated first portion in a scrubbing zone, separating the first portion enriched in catalyst from insoluble catalyst sludge, and passing the two portions to the reaction zone for conversion of the normal paraffin into isoparaffin.

2. In the isomerization of a normal paraffin hydrocarbon to an isoparaffin wherein said hydrocarbon is contacted in a reaction zone at an elevated temperature with a molten salt catalyst comprising aluminum chloride, thereby deactivating a portion of the catalyst to a catalyst sludge, the improvement which comprises separating the hydrocarbon feed, which is at a temperature at least 15° F. below the reaction zone inlet temperature, into a first portion which is from about 40% to about 95% by weight of the feed and a second portion, heating the first portion to a temperature which is at least above the reaction zone inlet temperature and such that the weighted average temperature of the two portions is the reaction zone inlet temperature, scrubbing at least a portion of the sludge-containing catalyst with the heated first portion in a scrubbing zone, separating from isoluble catalyst sludge the first portion now enriched in catalyst components, then passing the two portions together with hydrogen chloride to the reaction zone wherein the normal paraffin is converted to the isoparaffin.

3. The process according to claim 2 wherein the normal paraffin has from four through six carbon atoms per molecule and the molten salt catalyst is a mixture of aluminum chloride and antimony trichloride.

4. In the isomerization of a normal paraffin hydrocarbon to an isoparaffin wherein said hydrocarbon is contacted in a reaction zone at an elevated temperature with a molten salt catalyst comprising aluminum chloride, thereby deactivating a portion of the catalyst to a catalyst sludge, the improvement which comprises separating the feed, which is at a temperature at least 15° F. below the reaction zone inlet temperature, into a first portion in an amount which is from 40 to 95% by weight of the feed and a second portion, heating only the first portion to a temperature which is at least above the reaction zone inlet temperature and such that the weighted average temperature of the two portions is the reaction zone inlet temperature, said reaction zone inlet temperature being at least 140° F., scrubbing at least a portion of the sludge-containing catalyst with the heated first portion in a scrubbing zone, separating from insoluble catalyst sludge, the first portion now enriched in catalyst components, then passing the two portions, together with hydrogen chloride to the reaction zone for conversion of the normal paraffin into isoparaffin.

5. The process according to claim 4 wherein the normal paraffin has from four through six carbon atoms per molecule and the molten salt catalyst is a mixture of aluminum chloride and antimony trichloride.

6. The process according to claim 5 wherein the normal paraffin has from five through six carbon atoms per molecule and the mixture is passed together with hydrogen chloride and hydrogen to the reaction zone.

References Cited by the Examiner

UNITED STATES PATENTS

| | | | |
|---|---|---|---|
| 2,366,699 | 1/45 | Crockett et al. | 260—683.74 |
| 2,411,835 | 11/46 | Ross et al. | 260—683.75 |
| 2,417,698 | 3/47 | McAllister et al. | 260—683.75 |
| 2,420,086 | 5/47 | McAllister et al. | 260—683.75 |
| 2,447,573 | 8/48 | Gerbes | 260—683.74 X |

ALPHONSO D. SULLIVAN, *Primary Examiner*.